Patented Apr. 12, 1938

2,114,162

UNITED STATES PATENT OFFICE 2,114,162

METHOD OF TREATING RUBBER

Carl L. Beal, Cuyahoga Falls, Ohio, assignor to American Anode Inc., Akron, Ohio, a corporation of Delaware No Drawing. Application March 16, 1934, Serial No. 715,915

8 Claims. (Cl. 18—58)

This invention relates to the treatment of rubber and has especial reference to methods in which compounded rubber is treated with organic solvents for the purpose of altering, either temporarily or permanently, certain physical properties of the rubber. As examples of such methods may be mentioned the heretofore known process in which a latex rubber article, such as a glove, is partially dried, and then immersed for a short time in an organic solvent for the purpose of producing upon the glove a rough surface, and the method which I have described in another application Serial No. 714,605 filed March 8, 1934, now U. S. Patent No. 2,095,119, granted October 5, 1937, which includes temporarily swelling a sheet of rubber by treatment with an organic solvent or swelling agent, then cutting the swollen sheet, and finally removing the swelling agent from the cut rubber to restore it to its normal condition.

In practicing such methods, difficulty has been experienced which is believed to have been caused by the removal of essential compounding materials from the rubber by solution in the treating agent, since the most effective and frequently used agents are the common organic rubber solvents such as benzol, naphtha, gasoline, carbon tetrachloride, etc. in all of which many of the usual rubber compounding materials are more or less soluble. Thus, rubber gloves which have been surface roughened by treatment before vulcanization in the manner described above, frequently do not cure satisfactorily and do not age as well as untreated gloves. Similar deleterious effects upon other properties of the rubber have been observed in roughened gloves as well as in other rubber articles which in the course of manufacture have been treated with an organic solvent.

The principal purpose of the present invention accordingly is to provide a method for treating rubber with liquid solvents without removing from the rubber any of the essential compounding ingredients or otherwise producing deleterious results. A further object of the invention is to provide a method of making rubber articles having a roughened surface superior in many respects to prior similar products. Other objects will be apparent from the following description of the invention.

In treating compounded rubber with a liquid solvent as in any of the methods hereinabove mentioned, I have found that the undesirable removal of a soluble compounding material, or other deleterious effect of the treatment, may be entirely eliminated by adding to the solvent with which the rubber is to be treated, a quantity of the soluble compounding material just adequate to establish an equilibrium between the soluble material in the rubber and that in the solution when the rubber is treated therewith. As a practical matter, I have found that the desired results are obtained if the concentration of the soluble material in the treating solution is approximately equal to the concentration of the same material in the rubber to be treated, although considerable variation in these relative proportions is permissible apparently without great effect. Obviously, it is also desirable that conditions of treatment be so adjusted that the quantity of soluble material in the rubber shall not be increased. At the present time I am not prepared to describe the mechanics of the process nor to state whether the apparent equilibrium set up is kinetic or static, i. e., whether it involves balancing diffusion of the soluble material from the rubber into the solvent by an equal and opposite diffusion of the same material from the solvent into the rubber, or whether it is a result simply of reducing the solvent effect of the liquid solvent by partially or completely saturating it with the soluble material. In either event, the practical effect is the same, namely, to prevent the removal of any substantial portion of an essential compounding ingredient, and in fact to prevent any appreciable change whatever in the composition of the rubber. Since the composition is undisturbed by such treatment, the physical properties of the rubber are in nowise deleteriously affected.

The invention will be described somewhat more in detail with reference to a specific embodiment exemplified by the manufacture of a rubber glove having a rough surface particularly adapted for handling wet or moist objects without slippage. In manufacturing such an article, a glove form of usual construction is immersed in a liquid dispersion of rubber carefully compounded to provide a vulcanizable rubber composition, for example a dispersion containing 100 parts by weight of rubber added as concentrated natural rubber latex, 2.0 parts zinc oxide, 2.5 parts sulfur, and 0.5 part of an organic accelerator consisting principally of a heptaldehyde-aniline condensation product such as the commercial product known as "Heptene base", the latter three constituents being added in the form of colloidal dispersions, and solids are deposited from the dispersion upon the form until a layer of a desired thickness is built up. The deposition of the solids may be effected in any known manner but I preferably employ a method capable of producing a deposit of the desired thickness at a single immersion in the dispersion to avoid stratification and other undesirable features of deposits produced by so-called multiple dip processes. For example, I may coat the form with coagulant before it is dipped in the dispersion or I may employ electro-phoretic means for producing the deposit, or a porous form with suction applied to the interior thereof, etc., although it is to be understood that the invention hereof is by no means limited to any particular method of producing the deposit. Having produced the deposit of rubber and compounding ingredients, I next dry the deposit to an extent sufficient at least to remove substantially all the water from a surface portion thereof and preferably to dry the deposit to a depth greater than that to which the solvent penetrates in the subsequent treatment. For example, although definite roughening of a fairly satisfactory character may be produced if the deposit is dried for only a few minutes at a temperature say of 135° F., I have found, contrary to prior teachings, that a far superior type of surface roughening is produced upon subsequent treatment with solvent if a deposit say 0.01 inch to 0.02 inch thick is dried at least the equivalent of one hour at 135° F. and preferably two hours at that temperature to produce a deposit which is dried to a depth far greater than any to which the solvent penetrates and which for all practical purposes is completely dry although it may contain a few per cent. of residual water. The dried deposit then is immersed for a short time varying from several seconds to four or five minutes, in a liquid having a specific swelling or solvent action upon rubber such as benzol, solvent naphtha, gasoline, or carbon tetrachloride, for example, solvent naphtha to which has been added 0.5 part by weight of the heptaldehyde-aniline condensation product, per 100 parts of solvent. After treatment with the solvent solution, the rubber glove is dried and then vulcanized for thirty minutes at 275° F. It is found that a glove so made is well vulcanized, ages excellently and exhibits a very fine rough surface formed by a multitude of minute linear depressions in the surface which closely simulate the linings upon the human hand and which provide an especially satisfactory non-slip glove.

In a second example of my invention, a sheet of compounded latex rubber is prepared in any suitable manner as by depositing solids upon a rotating drum, from an aqueous dispersion containing 100 parts by weight of rubber added as concentrated natural latex, 2.5 parts sulfur, 2.0 parts zinc oxide, 0.5 part mercaputo benzo thiazole, 0.2 part of ethylidene aniline, and 1.0 part of the commercial age-resister consisting principally of di-tolylamine wax and known as "Agerite gel". The latex rubber sheet is dried and partially vulcanized and then is immersed for fifteen minutes in benzol containing 0.2 part by weight of ethylidene aniline, and 1.0 part of di-tolylamine wax per 100 parts of benzol, after which the sheet, now swollen, is cut into strip form. Finally the cut strips are again dried and vulcanization of the rubber is completed. The strips vulcanize satisfactorily and age excellently, since none of the essential vulcanizing or age-resisting agents are removed.

It is obvious that the principles of this invention may be utilized in treating rubber compositions containing soluble constituents in addition to those hereinabove specifically mentioned since the character of soluble material or its function in the rubber composition is immaterial in so far as the present invention is concerned. The removal of vulcanizing agents, softeners, dyes, etc. which may be more or less soluble in the solvents employed may be prevented by applying the principles of the invention. Likewise considerable variation in the concentration of the soluble material in the solvent is permissible and it is not essential that such concentration be the same as the concentration of the material in the rubber. Experimentation will readily indicate suitable concentrations in a particular case.

The term "rubber" has been employed in a generic sense to include caoutchouc, gutta percha, balata, synthetic rubber, and like gums or resins, and likewise the term "latex" is intended to include both natural and artificial aqueous dispersions of rubber as hereinabove defined, whether such dispersions are concentrated, diluted, thickened, thinned, stabilized, vulcanized or otherwise preliminarily treated. The dispersion may contain any desirable compounding ingredients in addition to those hereinabove specifically mentioned.

Numerous modifications and variations may be made in details of the invention as hereinabove described without departing from the scope of the discovery as defined by the appended claims.

I claim:

1. The method of retaining intact the vulcanization characteristics of a vulcanizable but unvulcanized rubber composition during its surface treatment with a liquid solvent having the capacity to dissolve from the rubber composition during such treatment at least a portion of an ingredient facilitating vulcanization of the vulcanizable rubber composition, which comprises dissolving in the liquid solvent prior to treatment of the vulcanizable but unvulcanized rubber composition a quantity of such vulcanization ingredient adequate to inhibit any substantial change in the amount of such vulcanization ingredient in the rubber composition during the treatment thereof, treating the surface of the vulcanizable but unvulcanized rubber composition with the so modified liquid solvent without changing materially the content of such vulcanization ingredient in the rubber composition, and thereafter vulcanizing the rubber composition so treated.

2. A method as defined by claim 1 in which the relative proportion of the vulcanization ingredient dissolved in the liquid solvent is substantially equal to the relative proportion of the same ingredient present in the rubber composition to be treated with the liquid solvent.

3. The method of retaining intact during treatment with a liquid solvent the characteristics and composition of a rubber composition containing in proportions necessary to produce a desired product compounding ingredients at least one of which is soluble in the liquid solvent to be used to such an extent that a considerable quantity of said soluble ingredient normally would be removed from the rubber during treatment with the liquid solvent, which comprises dissolving in the liquid solvent prior to treatment of the rubber composition a quantity of said soluble compounding ingredient adequate to inhibit any substantial change in the amount of such ingredient in the rubber composition during the treatment thereof, and treating the surface of the rubber composition with the so modified liquid solvent without changing materially the content of such soluble ingredient in the rubber composition.

4. The method of making a latex rubber article having a skin-like roughened surface which comprises producing from compounded liquid rubber latex a shaped deposit containing substantially unvulcanized rubber and a compounding material soluble in rubber swelling agents, drying the deposit at least sufficiently to remove substantially all the water from a surface portion thereof, treating the dried surface for a short time with a rubber swelling agent containing a sufficient quantity of dissolved material similar to said soluble compounding material to prevent removal of any substantial portion of such material from the rubber, and vulcanizing the rubber.

5. A method as defined in claim 4 in which the deposit is dried to a depth greater than that to which the swelling agent penetrates.

6. A method as defined in claim 4 in which the deposit is subjected to a drying treatment at least equivalent to heating for one hour at 135° F.

7. The method of making a latex rubber article having a skin-like roughened surface which comprises producing from compounded liquid rubber latex a shaped deposit containing unvulcanized rubber and a compounding material soluble in organic solvents for rubber and which is necessary for vulcanization of the rubber, drying the deposit at least sufficiently to remove substantially all the water from a surface portion thereof, contacting the dried surface for a short time with an organic solvent containing a sufficient quantity of said soluble material to prevent removal of any substantial portion of the material from the rubber, and vulcanizing the rubber.

8. A method as defined in claim 7 in which the relative proportion of the soluble material dissolved in the organic solvent is substantially equal to the relative proportion of such material present in the rubber.

CARL L. BEAL.